(12) United States Patent
Hart

(10) Patent No.: US 9,069,930 B1
(45) Date of Patent: Jun. 30, 2015

(54) SECURITY INFORMATION AND EVENT MANAGEMENT SYSTEM EMPLOYING SECURITY BUSINESS OBJECTS AND WORKFLOWS

(75) Inventor: Catherine V. Hart, Burlington, MA (US)

(73) Assignee: EMC Corporation, Hopkinton, MA (US)

( * ) Notice: Subject to any disclaimer, the term of this patent is extended or adjusted under 35 U.S.C. 154(b) by 1058 days.

(21) Appl. No.: 13/074,250

(22) Filed: Mar. 29, 2011

(51) Int. Cl.
*G06F 21/00* (2013.01)
*G06F 21/57* (2013.01)

(52) U.S. Cl.
CPC .............. *G06F 21/00* (2013.01); *G06F 21/577* (2013.01)

(58) Field of Classification Search
None
See application file for complete search history.

(56) References Cited

U.S. PATENT DOCUMENTS

| | | | |
|---|---|---|---|
| 8,407,798 B1 * | 3/2013 | Lotem et al. | 726/25 |
| 2007/0192863 A1 * | 8/2007 | Kapoor et al. | 726/23 |

* cited by examiner

*Primary Examiner* — Brandon Hoffman
*Assistant Examiner* — Helai Salehi
(74) *Attorney, Agent, or Firm* — BainwoodHuang

(57) ABSTRACT

A security information and event management (SIEM) system includes a data storage sub-system that stores (1) security data pertaining to security-related events and states of a production computer system, (2) security business objects (SBOs) as an abstraction layer over the security data, and (3) workflows which each include a set of the SBOs organized in a workflow-specific manner. Each SBO represents a security-related aspect of the production system and includes data queries to generate output data pertaining to the security-related aspect. Each workflow embodies a complex multi-step security analysis operation. In operation, security users of the SIEM system execute the workflows including the respective security business objects, resulting in a set of result data which identifies security threats and vulnerabilities of the production computer system. A workflow can provide additional contextualization for detected events, including asset data regarding the configuration of hosts in the data processing system which can be used to generate recommendations for remedial action, such as applying certain software patches to address a threat.

22 Claims, 5 Drawing Sheets

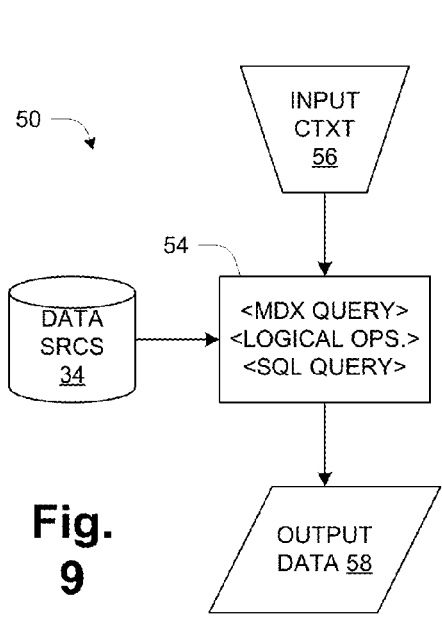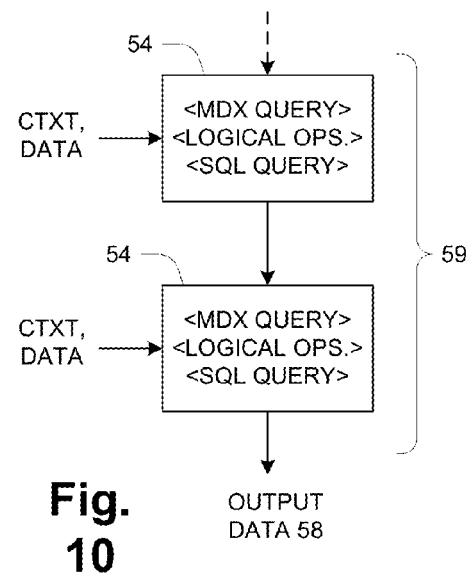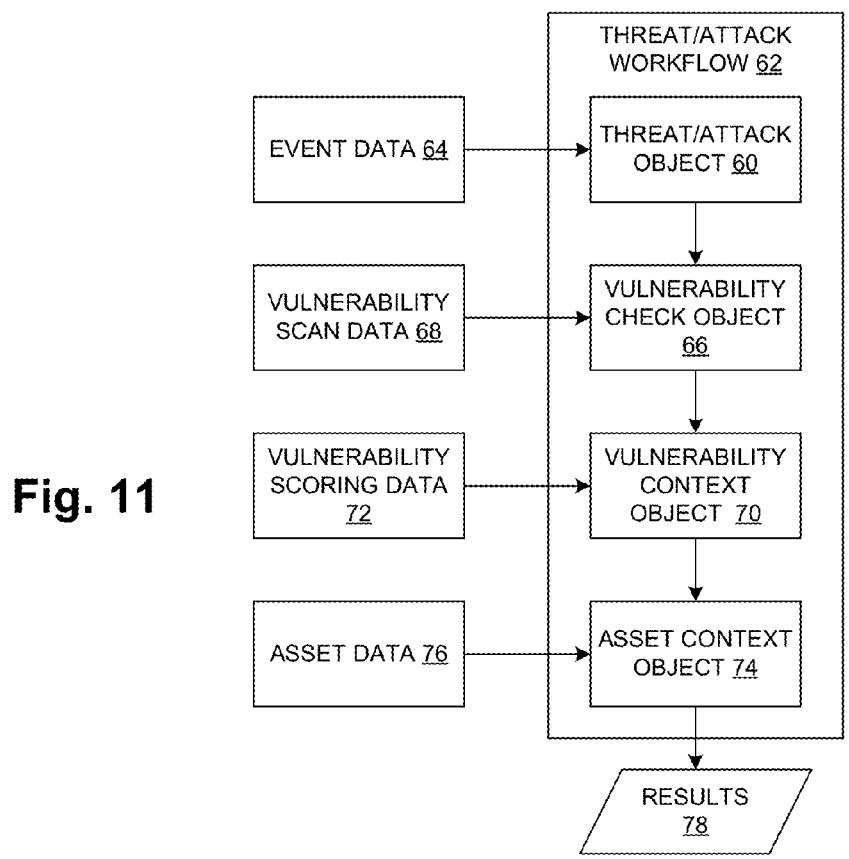

SECURITY INFORMATION AND EVENT MANAGEMENT SYSTEM EMPLOYING SECURITY BUSINESS OBJECTS AND WORKFLOWS

BACKGROUND

The invention is directed to the field of security in data processing systems.

It is known to deploy security information and event management (SIEM) systems to facilitate security-related operations in data processing systems, especially in large systems as may constitute a data center of an organization for example. The SIEM system is used to collect security-related data from the data processing system, such as data from event logs describing detected activities in the system that may have security implications, and to assist security-focused personnel in carrying out security procedures. These may include real-time monitoring of a system to detect and neutralize attacks or threats; mining historical data for auditing or forensic purposes; and analyzing the data processing system for security vulnerabilities in the interest of improving system security. As a collection point for security-related data, a SIEM system typically includes a database in which the security-related data is stored, and software tools that users employ to gather and analyze relevant data.

SUMMARY

While existing SIEM systems provide data access and analysis tools as described above, security operations have continued to rely heavily on the expertise of security-focused users (e.g., security analysts, security engineers etc.) having specialized knowledge about the types of analysis to be performed and the data that pertains to the analyses. Such sophisticated users make use of the SIEM system in a somewhat low-level way, gathering and processing relevant data by a manual, multi-step process. More specifically, a system user typically generates queries into the SIEM database to obtain data regarding events in the system, for example, and then generates additional queries to obtain data pertaining to contexts for the events. For example, the user may obtain information regarding the vulnerability of system components (e.g., host computers) to a particular kind of attack that might be associated with an event appearing in an event log. Based on the vulnerability information, the user might conduct the remaining analysis in one of multiple possible ways, each potentially involving additional queries, filtering and analysis of data.

A SIEM system is disclosed with features supporting richer and more powerful data retrieval and analysis tools, enabling users to conduct security analyses more efficiently and potentially to entirely automate some types of analysis processes, providing increased effectiveness against security attacks or threats in a data processing system.

The disclosed SIEM system includes a data storage sub-system that stores security data from one or more sources, the security data pertaining to security-related events and states of a production computer system. Additionally, the storage sub-system stores a collection of software components referred to as "security business objects" which serve as an abstraction layer over the security data. Each security business object generally represents a respective security-related aspect of the production system and includes a set of queries of the sources of security data to generate output security data pertaining to the security-related aspect. The SIEM system also maintains a collection of security "workflows", each including a respective set of the security business objects organized in a workflow-specific manner and each embodying a complex and multi-step security analysis operation with respect to the production computer system. The security business objects and workflows are created by security users and maintained in the storage sub-system for use in security operations.

In operation, the SIEM system interacts with users to execute the security workflows including the respective security business objects. The execution of each security workflow generally results in a corresponding set of result data which identifies one or more security threats and system-specific vulnerability information regarding vulnerability of the production computer system to the security threats. More complex workflows may provide additional contextualization, including information regarding the configurations of individual computers (hosts) within the data processing system. The additional data may be used by a workflow to generate recommendations for remedial action, such as applying certain software patches that address the threat or attack but are not yet installed on a system.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 9 is a flow diagram depicting use of a security business object (SBO);

FIG. 10 is a flow diagram depicting use of a set of multiple SBOs;

FIG. 11 is a flow diagram depicting a workflow using a series of SBOs.

DETAILED DESCRIPTION

Figure 1:
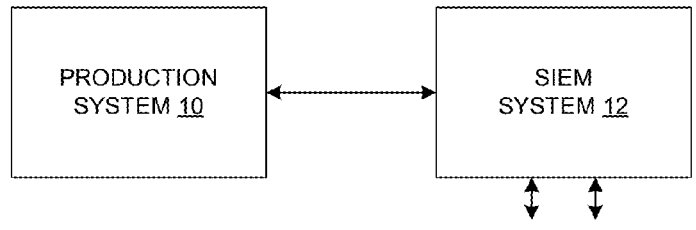
FIG. 1 is a block diagram of a data processing system.

FIG. 1 shows a data processing system including a production system 10 and a security information and event management (SIEM) system 12. As generally known in the art, the production system 10 is that portion of the data processing system used to deliver desired production-oriented services to a set of end users (or users), while the SIEM system 12 serves essentially an overhead function of helping secure the production system 10 from various kinds of data security threats, including intrusions, data theft or destruction, viruses and other malware, etc. As an example, the data processing system 10 may be operated by a financial institution, and the production system 10 may include a large set of hardware and software resources that provide on-line financial services to a large number of customers, while the SIEM system 12 is used to help manage security-related aspects of operation of the production system 10.

Figure 2:
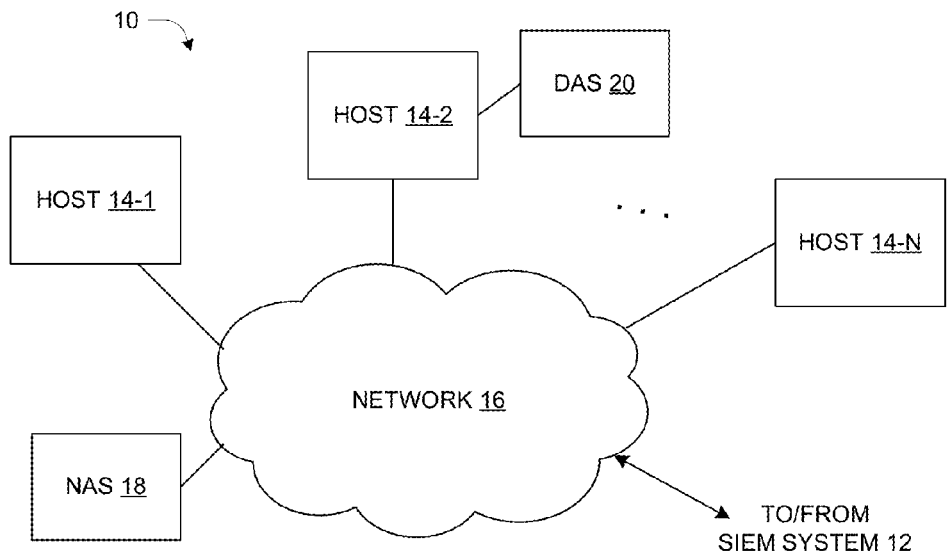
FIG. 2 is a block diagram of a production system portion of the data processing system.

FIG. 2 shows a possible configuration of the production system 10. It includes a plurality of computers or "hosts" 14 (shown as 14-1 through 14-N) coupled together by a network 16. Data storage resources are specifically shown in two possible forms, one being network-attached storage or NAS 18, and the other being direct-attached storage or DAS 20. In this description, DAS 20 represents storage resources/devices that are directly connected to a given host 14, as well as storage resources that may be deployed in a so-called storage area network or SAN (not specifically shown in FIG. 2) which will generally be shared by multiple neighboring hosts 14, such as within a building.

Figure 3:
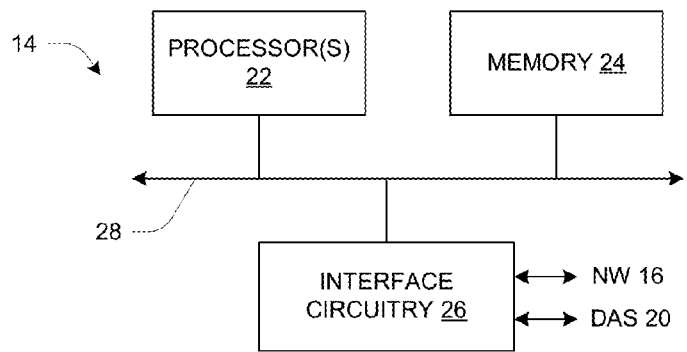
FIG. 3 is a block diagram of a computer illustrating hardware components.

FIG. 3 shows a block diagram of hardware resources of a typical host 14. The include one or more processors 22, memory 24, and interface circuitry 26 all coupled together by interconnect circuitry 28 (such as one or more high-speed data buses). The interface circuitry 26 connects the host 14 to the network 16 and/or DAS 20, for example. In the present description, some or all of the items of FIG. 3 may be referred to as "processing circuitry".

Figure 4:
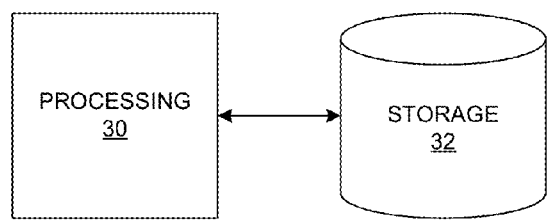
FIG. 4 is a block diagram of a security information and event management (SIEM) system portion of the data processing system.

FIG. 4 shows a high-level organization of the SIEM system 12, including a processing sub-system 30 and a storage sub-system 32. The storage sub-system 32 generally includes hardware storage devices (e.g., disk drives) with high-speed external data connections, as well as certain software used to store data on the storage devices and retrieve data from the storage devices. The processing sub-system 30 may include one or more server-type computers (having a hardware organization similar to that shown in FIG. 3 for hosts 14) and certain operating software that provides a set of SIEM-related functions. Additional details for both sub-systems are given below.

Figure 5:
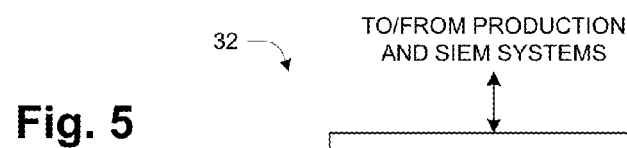
FIG. 5 is a block diagram of a data warehouse of the SIEM system.

FIG. 5 shows a high-level organization of the storage sub-system 32. It includes one or more data sources 34 and one or more security database (DB) servers 36. In FIG. 5 the data sources 34 are shown as an event source 38, a vulnerability (VULN'Y) source 40 and an asset source 42. For each data source 34, there are typically underlying hardware and software components which are omitted from FIG. 5. As shown, the data sources 34 may have connections to external systems, also not shown. As an example, the vulnerability source 40 may communication with an external system that maintains vulnerability scoring information for a large number of potential system configurations. One such external system is the National Vulnerability Database or NVD. Known standards that define the structure used by vulnerability recognition and ranking include a "common vulnerability scoring system" (CVSS) and a "common vulnerabilities and exposures" (CVE) database.

Data Ontology

The present description uses the term "data ontology" to refer to the overall content, meaning and structure of all security-related data that is the subject of collection, storage, access and processing as described herein. The intent of the data ontology is to allow fast, flexible correlations of data from potentially disparate sources in an intuitive manner. This statement has several important implications. First, in order for data to be correlated from all sources of data, including for example events, vulnerabilities, assets, and identities, a consistent universal data model is applied to these realms regardless of underlying table structure. Second, data storage and retrieval are to a large extent "context-agnostic"—while the context in which data is gathered may provide some important metadata for use, in general the data is preferably stored such that it can be retrieved by name regardless of origin. Finally, the data model should be rigidly enforced even in cases where some modifications may be permitted, such that aliasing of certain names is possible for example, without impacting the overall integrity of the in-built data model.

Basically, the data ontology seeks to apply an important principle, namely the use of a single, coherent data dictionary that describes all of the objects in the universe of data (as understood by the system), to further the goal of complete correlation and data transparency.

One goal of the system is to enable various different use cases to symmetrically and seamlessly access data related to security incidents, trends, and compliance. By collapsing all data into a monolithic ontology with well-understood naming conventions (i.e., names that accurately describe objects in full), any of the primary users will be able to obtain those items sought as part of a business goal. Generally, a system-level understanding of typical network flows is required to achieve this, such that inputs and outputs are successfully represented in any downstream content using the data model.

Figure 6:
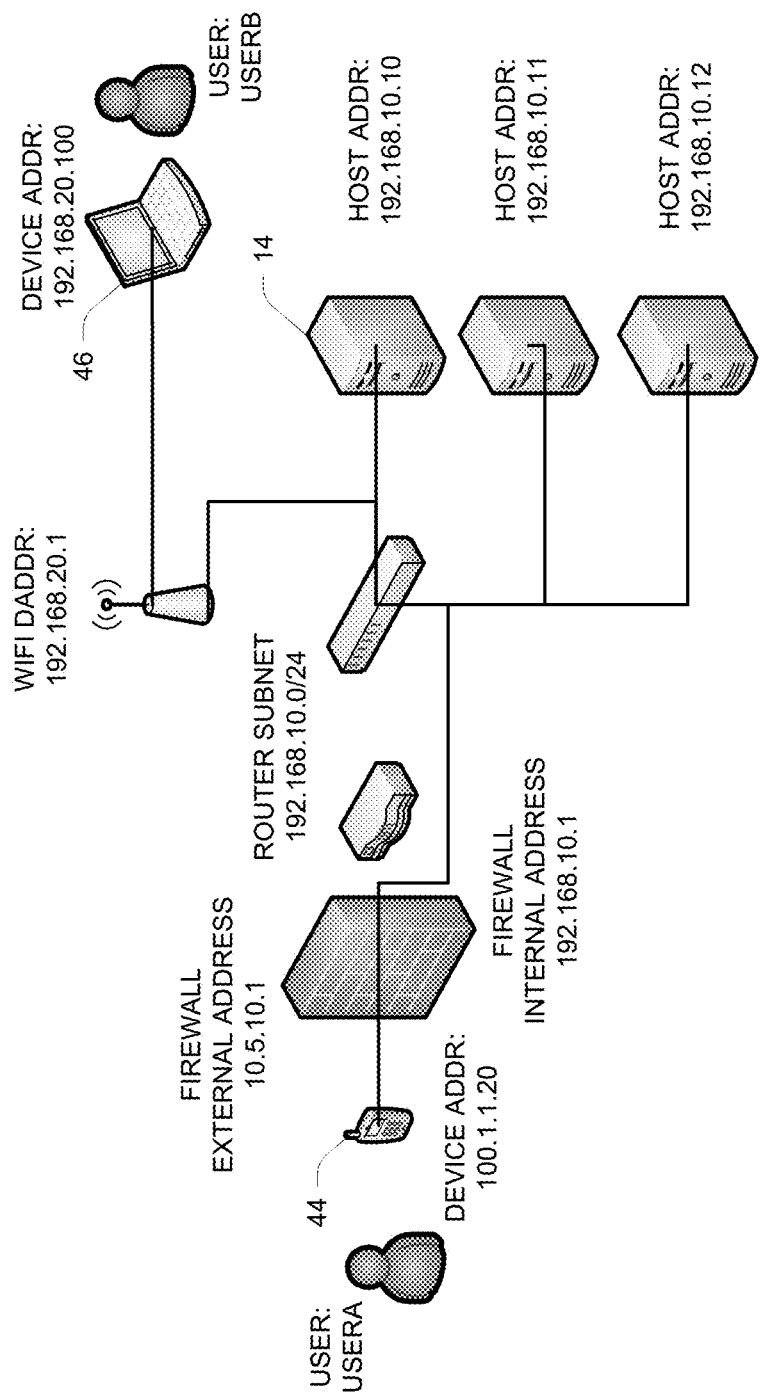
FIG. 6 is a schematic diagram illustrating a model for system data.

FIG. 6 shows an example of a basic scenario to be represented in the system. In this model, there are discrete information components about the network addresses and users of each device (e.g., smartphone 44, hosts 14, laptop computer 46, etc.). However, for any given communication context, each of these addresses could act as a source address, a destination address, a host address, or a router address, and there might also be network address translations that occur. Therefore, it is important that on a per event basis, the system is able to recognize key relationships between source and destination, and look up component information in the appropriate data store (e.g. event store 38, vulnerability store 40, asset store 42). Context-dependency is the key to accurate correlation.

The primary columns available in the database provided by database servers 36 correspond to variable data—that is, data parsed into individual units of meaning described by the data dictionary. Each column also retains a relationship to an original complete message from which it has been derived, which may itself reside in another unique column (a message column). This conception meshes well with the column-orientation of certain columnar databases, as queries are run primarily seeking certain patterns in variable data.

Again, as data access and correlation is the primary goal, data is stored such that variables and metadata (including other attributes such as category) are made available in an any-to-any schema configuration. This can be deployed as a typical star or snowflake schema, but there should be no inherent design in the database layer that prevents any individual item being correlated with an arbitrary other. It is important that data be normalized in order to perform the advanced functions being proposed in the Security Business Objects layer described below.

Figure 7:
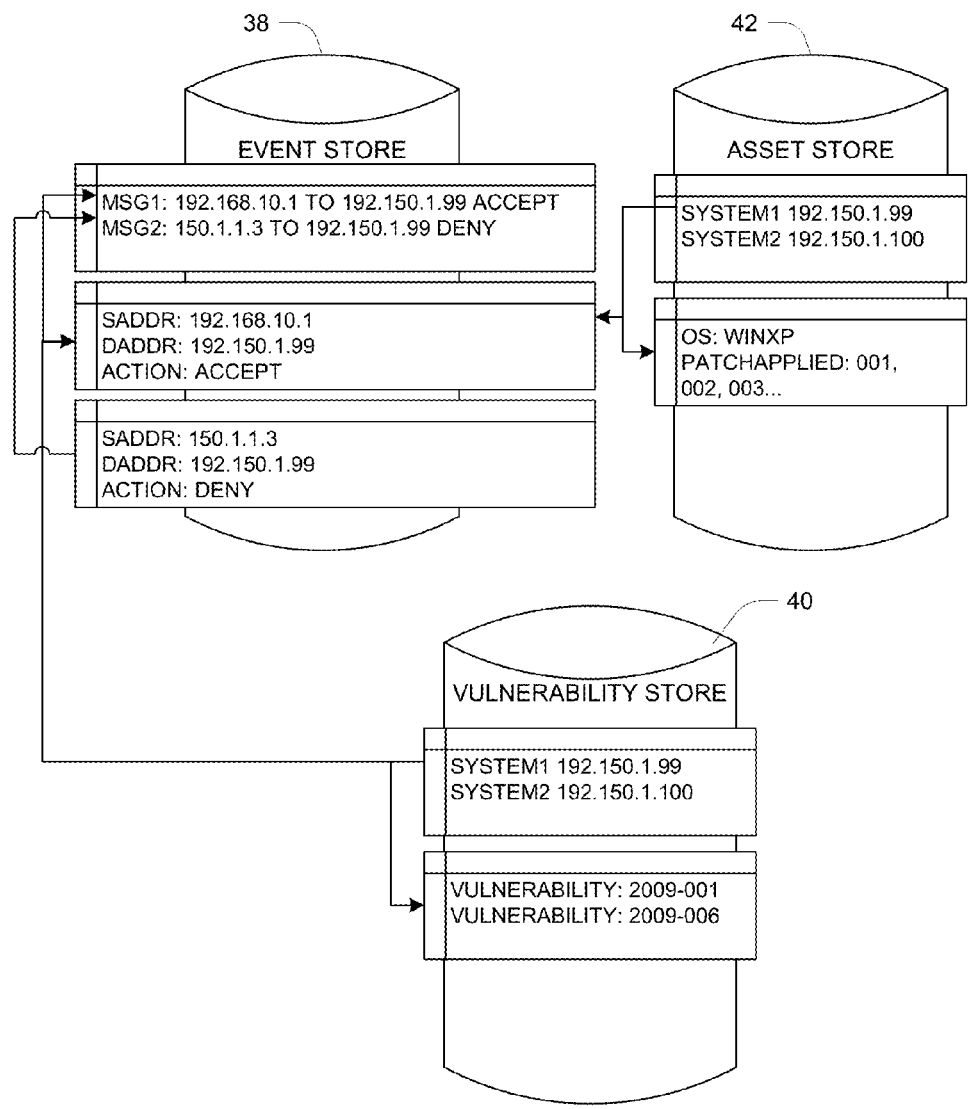
FIG. 7 is a schematic diagram of contents and relationships among different types of security-related data.

FIG. 7 shows a high-level representation of a data model according to the above description. In this figure, correlation between an event in the event datastore, asset data in the asset datastore, and vulnerability information in the vulnerability datastore is shown. The event marked as "MSG1" shows a firewall event accepting data from source address 192.168.10.1 to destination address 192.150.1.99. Also shown in the event store (38) is the data represented as variables (saddr, daddr, action) for two messages. As MSG1 is of interest to an investigation, information is sourced from the Asset Store (42) that details the Operating System and applied patches for the destination host (192.150.1.99), which is known to the asset system as SYSTEM1. Once this information is gathered, an additional correlation is performed between the data found in the Asset Store and the Vulnerability store, showing the particular vulnerabilities to which SYSTEM1 is open.

Given this data, a user can determine whether the initial event is a component of malicious activity (i.e., exploiting a known vulnerability) as well as what potential mitigations exist (e.g. installing certain patches.). By using state data in conjunction with event data, the security posture of a system can be directly known via correlation activities.

Data Model Updates

Generally it is desired that the data model cover all meanings that are currently known, but this goal may be unrealistic in practice. Thus, the data model will generally need to have new meanings (and thus columns) added on occasion. This can be accomplished by having content updates include not only analytic and parsing functionality, but also structural updates to the underlying data model. Although this may be more difficult to instantiate in some databases (since it entails the modification of a running schema), it will only involve the addition of new columns—existing columns should not be modified under this model.

On a related matter, there is a question how to handle historical data that was not parsed using a new variable. If the system does not have direct parsing capabilities for events, it will not be possible to correct historical data for meaning additions. However, as new data is parsed in and loaded, the changes will be made available. Additionally, for stateful data (as described below), a backward-normalization of existing information would be possible.

Categorizations of Data

A taxonomy of data is generally required. It is proposed that a set of taxonomy categories be arranged in a hierarchy that describes broad sets of meaning for both state and event data (both of which are described below). These categories should have the features of being mutually exclusive, such that any given event falls in exactly one taxonomy node. This principle maximizes the effectiveness of grouping data together using a taxonomy, as intuitive, easy-to-reference categories are the desired result.

The taxonomy need not be the sole set of categorizations available within the system. Assuming as a premise the use of a well-defined set of objects (variables), multiple taxonomies can describe the manner in which data relate to each other. Examples might include taxonomies based purely on threat, behavior-centric taxonomies, etc. Users could create their own taxonomies using a content construction tool by grouping variables together as they see fit. While this might be difficult to extend to events (as in such a case a user must pull those specific events that are of interest into their self-defined taxonomies), grouping variable data types together provides an additional set of methods for users to intuitively deal with data as presented, and potentially minimizes the research necessary for content development. For example, if all authentication-related variables are grouped, they could be referenced by a single category. Though these are not event categories, they are nonetheless useful groupings of data.

State Versus Event Data

One of the aspects of the system is the mixture of state data (i.e., data that represents a point-in-time configuration or standard) and event data (i.e., data representative of the ongoing workings of a network of devices). While data in the event flow may represent a given state, it is not stateful per se due to the dynamic nature of log acquisition. Event data can represent a state, but is not inherently stateful. State data, on the other hand, is collected from a system that is itself providing some stateful service on the network. Vulnerability systems, asset systems, and identity systems are all examples of overall systems that use a concept of stateful data—for example, when a vulnerability scan is run, a point-in-time understanding of the security posture of a target system is scanned and stored. When this data is accessed, it is understood as representing the state of the systems at the time of last scan, rather than being associated with a specific event time.

While it is possible to make separations in the way state data and event data are used, the overall goals of system might discourage such an approach. It is generally necessary to use both state and event data concurrently and seamlessly in the course of an investigation. An example might be verifying that the state of a system is indeed vulnerable (per vulnerability and asset systems) to an attack that is being researched in the event stream. The use of state data in this manner is referred to herein as "contextualization". Given these considerations, the same data model should apply regardless of data origin. Certain types of transforms may need to occur as described below.

However, these two types of data working in the same model present potential issues. If a set of state data is updated during the course of an investigation, e.g. the vulnerability system runs scans and updates the system while an investigation into an incident is taking place, the data presented may not accurately represent the state of the target system at the time of the incident. In order to support certain types of investigative functionality, a time-binding is proposed for all state data. As events roll in on a constant basis, investigations may be run at any preserved point in some predetermined period, such as a 90-day cycle of system data. State data is marked with a time dimension upon being loaded; that is, all data from a state system is assigned an event-time like attribute that notes the point at which it was collected. As new data is collected from state systems, prior states are preserved in a change-log-like format—that is, only changes to a known state, and their timing, are stored in the datastore.

This approach has two major advantages—one, it allows for easy correlation at any point in time between the disparate data types described. Two, it minimizes system storage by representing only changes to items, and the time at which the change was detected. The implications in an investigative use case are that when a timeframe for data retrieval is specified, only those state items falling within those dimensional boundaries will be retrieved, meaning that the state data will be relevant to those events being processed as a part of the investigation.

User-Defined Data

While most systems supplying data may be sourced via a content development process, a system may allow for users to import data of their own devising into the system. In general, the user might be presented with a listing of the ontology as currently supported, and asked to select the most appropriate meanings for the variable items.

However, even with such measures in place, it is possible that users will encounter variable data that does not fit the ontology. This is potentially dangerous ground, as allowing the user to create a new meaning is in direct conflict with the goal of universal correlation—user-created variables by definition have no relationship with those defined in the system. The proposed solution is to allow for user-defined variables in a constrained framework, as well as user-defined aliasing of these variables for appropriate correlation. For truly user-defined variables (i.e. those that have no semantic backing in the product currently), a user may be permitted to populate from a limited set of available "free" variables and assign an aliased name. Once defined, the user can use this variable as they would any other available at the content layer. On the backend, an "unknown meaning" process may be initiated which focuses directly on variables. For each user-created variable defined, a dataset is generated that notes the data that the variable was applied to, the user-created alias, and the usage of the variable in any content artifacts. This data is bundled and provided (such as via network transport) to a data architect on a periodic basis. The new meanings are reviewed for correctness, de-duplicated, and included in a new content schema update going forward.

Assumptions and Dependencies

One of the important assumptions is that all data brought into the database, regardless of method, can be transformed into a single data model format. This has a number of implications, depending on the source of the data:

1. Event data must adhere to the data dictionary, and existing data may be pre-populated into an appropriate partial model.
2. Data being directly sourced from other systems such as asset or identity may need to undergo transformation in order to adhere to the data model. This functionality is generally referred to as ETL—extract, transform and load. A process at an ETL layer performs a data normalization and applies the ontology prior to database load (this is referred to as "state data" in the preceding section.).
3. The data ontology depends on the database technology which is employed (e.g., a columnar database) While each layer of functionality ultimately relies on the ontology, the primary interactions for accessing data occur between application software and the database.

The following is a list of generally desirable attributes of systems as described herein:

1. Security Events and Log Data Model (normalized)—The system provides a normalized data model that represents security events and logs from across diverse and heterogeneous devices. This includes the ability to describe data structures, elements and attributes of any permitted custom event data.
2. Correlation of security events and log data—The system correlates data across security events and logs from diverse and heterogeneous event sources.
3. Data model across SIEM products—The system preferably provides a normalized data model that can be extended across multiple SIEM products. The mapping of data models for other SIEM applications should be available as part of the system.
4. Asset information—Repository—The system provides asset information in a central repository along with security events and logs. The asset information should be relevant enough to provide additional context (business value classification) when conducting security investigations.
5. Asset Data Model—Default—The system provides a default data model for representing asset information for security investigations
6. Identity information—Repository—The system provides identity information in a central repository along with security events and logs. The asset information should be relevant enough to provide additional context (business value classification) when conducting security investigations.
7. Identity Data Model—Default—The system provides a default data model for representing identity information for security investigations 8. Data Model—Enterprise Vulnerability Scan Management System—The system should support a data model for representing vulnerability scans that is applicable for known enterprise vulnerability scan management systems, such as the following:
   Qualys
   McAfee
   ISS
   Nessus
9. Vulnerability Rating Data model—The system supports definition of data models for vulnerability rating of assets. The data for the vulnerability rating will be collected from the vulnerability scanning systems or alternatively will be based on a computational model created by the Security Architect (such as CVSS mentioned above).

Figure 8:
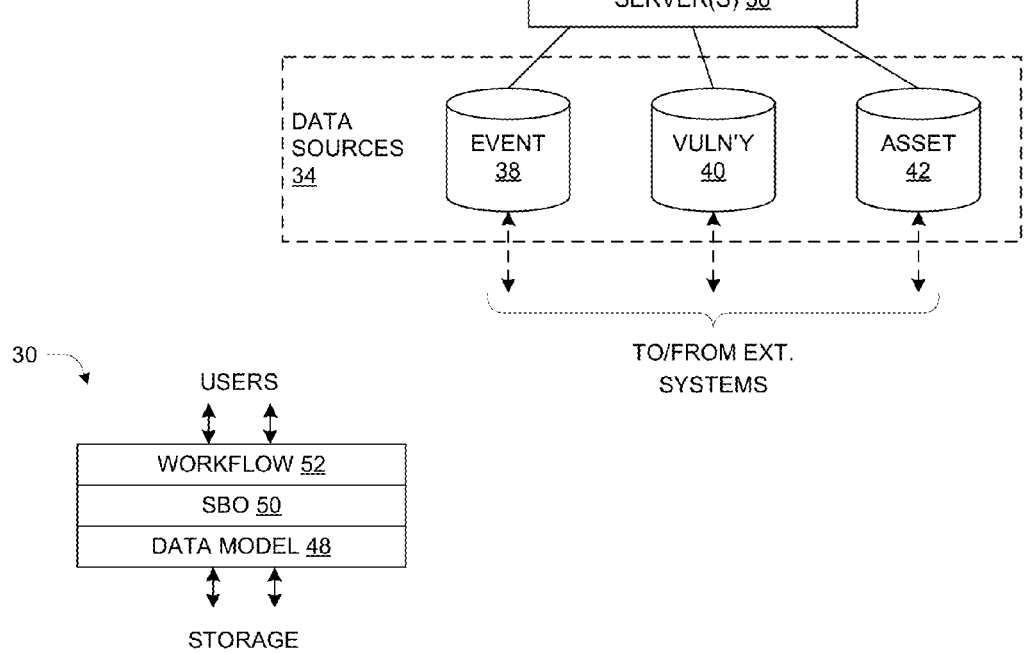
FIG. 8 is a schematic diagram depicting processing layers in the SIEM system.

FIG. 8 is a schematic depiction of functional layers in the processing sub-system 30 of the SIEM 12. A data model layer 48 serves as an interface to the data in the storage sub-system 32. A "security business object" (SBO) layer 50 provides an abstraction of the data model layer 48 using software components referred to as "security business objects" or SBOs. These are described in some detail below. A workflow layer 52 provides "workflows" for using the SBOs to realize complex processes of data gathering and analysis as well as advising a user regarding remedial action that can be taken. Workflows are also described below.

The SBO layer 50 provides an easy-to-use, abstracted interface into the complex and large sets of data stored in the system according to the data model 48. The overall concept of SBOs is intended to present a query model that provides easily-pluggable query objects that can be chained together using logical operators into a workflow. The end result of a workflow is a dataset that can be presented in any supported format, from simple relational tables to cube objects with drill-down capabilities.

Existing systems may support the concepts of reports and rules: reports are intended as investigative and audit tools, reaching back into event data that has already occurred. Alerts are intended as real-time notifications based upon the correlation of disparate events on a network. The SBO concept encapsulates both of these items and adds a more flexible interface: SBO workflows can apply to either historical or real-time data, and generally provide the same flexible data access, correlation, and contextualization features for each type of usage.

At the core of an individual SBO is a query which relies on a strongly-implemented and enforced data model. Complex correlations can be achieved across any dataset available (including events, vulnerabilities, assets, etc.) using a single, intuitive set of semantic objects. A single SBO provides a functional retrieval of data. For example, there may exist a "SQL Injection" SBO that queries across IDs, application firewalls, application servers, and even database engines, looking for combinations of events that are representative of a potential SQL injection attack. Not all of the data that this particular SBO is seeking needs to be available in order for the query to return relevant information, but each available item enriches the dataset returned.

FIG. 9 shows an example of basic structure and use of an SBO. The SBO itself is indicated at 54, and it includes one or more queries (shown as MDX query and SQL query) as well as logical operations that can be performed on the data returned by a query. Examples are given below. The inputs to the SBO 54 include input context (CTXT) data 56 and other data from the data sources 34. The SBO 54 generates output data 58 that may be used by a user directly or serve as input to another SBO in a workflow, such as described below.

An SBO 54 may also implement a complex programming language, rather than just a simple set of logical operators. For example, extending an SBO 54 to accept any command in e.g. a constrained Java derivative or a Perl-like interpreted language would allow for internal data transformation, rather than simple comparison and pattern matching. This can extend the capabilities of an SBO-based approach significantly beyond the capabilities of SIEM rules and reports as they exist today. For example, any complex set of comparisons over large datasets could be performed, no matter how algorithmically complex, and the result set could provide nuanced detail rather than explicit output. It is the implications of this point that eventually allows for powerful, abstracted queries to be generated and implemented. Furthermore, such a language would allow for further sanity checking within and among objects, such that e.g. type-mismatches, long-running (or impossible) queries, and other such pitfalls can be avoided.

FIG. 10 shows how individual SBOs 54 can be chained together into business workflows 59, each representative of a set of occurrences on a network that can be correlated to either filter or enrich the information gleaned from the base SBOs 54. For example, an "SQL Injection" SBO 54 could be chained with another SBO (e.g., a "Vulnerability" SBO) to determine whether the target IP address of a candidate attack is, in fact, vulnerable to this type of exploit. The Vulnerability SBO could itself contain references to CVE and CVSS data, and be filtered by the SQL Injection object. The net result is that systems that have been possibly attacked with a SQL injection can be shown as vulnerable or protected based upon e.g. patch levels retrieved by the Vulnerability object. This workflow chaining can be multiple layers deep, with logical operators providing connectivity between individual SBOs. These operators can include logical AND, OR, NOT, XOR, IF/THEN/ELSE, and FOLLOWED BY (time-bound if/then). The construction of workflows that accurately represent vulnerabilities, attacks, and exploits is generally the domain of security professionals. Analysis and modeling of the behaviors of threats is generally necessary to provide complete and accurate representations within the SBO layer 50.

The boundaries of an SBO 54 (versus a workflow) are described in terms of functionality. An SBO 54 is generally a reusable query unit that relates to one specific type of data goal being sought. SBOs 54 may be very generic in terms of their functionality—for example, the aforementioned "Vulnerability" module might take a system type and vulnerability type as inputs, and produce all relevant vulnerability data gleaned from the national vulnerability database (NVD) and vulnerability scanning systems as output. It is through the chaining of queries that data is pared down to a usable state: each step in a workflow provides an additional level of filtering or contextualization that aids a user in pinpointing precisely the data relevant to the business purpose at hand. Workflows themselves may be saved as complex query objects, consisting of smaller, atomic SBOs that provide the lower-level query functionality.

SBOs 54 can be split into two distinct types: trigger objects and context objects. A trigger object uses gathered information to proceed to the next step in a workflow. For example, searching for attack or vulnerability events could act as a trigger to begin or continue a workflow—if no events of this type are found, the workflow can exit. Complimentarily, context objects seek to enrich the data gathered in trigger objects. While data not being available in a context object would not be sufficient to halt a workflow, the information gathered via these objects can enrich the dataset output at the end. Simple examples include vulnerability scan results or asset data queries.

Each SBO 54 generally has an input (data gained via query) and an output (data that is exposed by the SBO). The inputs and outputs of a given SBO 54 are generally strongly defined in terms of lexical objects, as these constitute the manner in which SBOs are chained into a workflow. For example, in order for the hypothesized Vulnerability SBO to be combined (e.g. using a logical AND) with the SQL Injection object, one or more of the output types of the SQL Injection SBO must be available as input types for the Vulnerability SBO. In this case, the destination IP address (i.e. the IP address of the system being compromised) is the output of the SQL Injection SBO, and this feeds into the Vulnerability SBO as the identification of the system to be checked for vulnerabilities. Additionally, the Vulnerability SBO may take a static type (in this case, SQL Injection) as input to filter results.

FIG. 11 presents a fuller example to elucidate the above-described concepts, including SBOs 54, the underlying queries, and workflow chaining. In this example, a threat/attack SBO 60 (of a trigger type) initiates a workflow 62 by looking for SQL Injection-like events in event data 64. This individual SBO 60 may contain logic that looks for events related to SQL injection beginning at the database layer (e.g. looking for "select *") and deepening that data with other network event sources, such as application firewalls and IDS sensors. If multiple data points can be correlated in the initial data cube, a higher probability of successful exploit can be shown. The output of the SBO 60 includes the destination addresses of potentially affected machines, and this is fed as input to the next workflow step implemented by a Vulnerability Check SBO 66 (also a trigger object). This object could use preexisting scan data 68 to verify that the systems targeted are indeed vulnerable to the type of attack being specified. If not, the sequence may exit (not shown in FIG. 11). Assuming one or more systems are shown to be vulnerable, a Vulnerability Context SBO 70 could then reference the NVD (or other source of vulnerability scoring data 72) to evaluate the severity of the breach and assign a CVSS score such that the output can be prioritized appropriately. Finally, an identification of these potentially breached systems is passed to an Asset Context SBO 74. This object accesses asset describing data 76 to determine, for example, which software patches should be applied to mitigate the problem based upon current configurations and CVE data.

The result of this process is a highly dense Results data set 78, which presents not only the known attack, the systems affected, and a relative severity score, but also the steps (i.e. patches) that must be taken to mitigate the problem. In effect, the work of a security analyst has been transformed from a forensic process to a known set of actions based upon results-oriented workflow. As the results are presented in a multidimensional data set (also referred to as a "data cube"), any aspect of the data gathered can be drilled-down or used as a pivot point, should additional information be desired in any dimension.

In the above example, additional contextualization may be employed for other specific purposes. For example, a data loss prevention (DLP) object could show whether a data loss event can be associated with this breach, thus potentially initiating another workflow. The model is bound only by the types of objects that can be queried from the database, and ideally workflows can be built such that each step of a research or forensic process can be represented directly, thus automating the bulk of SOC operations.

As previously indicated, the use of SBOs 54 depends on the existence and use of a normalized, functional, and coherent data ontology for the overall system. This ontology generally consists of the permissible data in the system, the names for the data (using a unified convention), and the descriptions of the data. This is true for all data retrieved from all input systems. In some embodiments, the ontology may also reflect a computable "semantic payload" of each data item, both at the atomic (e.g., variable) and holistic (e.g., event) levels.

Another potentially important component of the SBO layer 50 (both in terms of construction and execution) is a high-level programming language which allows not only for structured queries, but also significant processing and data manipulation at the SBO layer 50 itself. This language could be any current compiled or interpreted language, implemented via an SBO construction tool. It may be desirable to allow users to specify a desired target language. Good languages for this purpose include Java and Perl.

SBOs 54 may be created using a construction tool which accounts for the expression and storage of SBOs 54 and business workflows. The expression should provide a coherent, abstracted interface into data ontology, such that Security Architect and Security Engineer users can create the queries necessary to form objects and workflows, as discussed below. The construction tool should represent not only the high-end use cases of construction but also the more basic use cases of assembling existing SBOs into usable workflows in a truly object-oriented model.

System Users

Users of the system may include the following:

I. Security Analyst

The security analyst is involved with the front-line operations of an enterprise security operations center (SOC). The security analyst investigates incidents as they are discovered, and consumes significant amounts of contextual data in this process. The primary interactions with the data ontology may be as follows:

Use SBO or widget workflows to access data by object name.

Connect SBOs into workflows that relate to a specific type of incident, marrying specific ontology items in the process.

Gather report results and extrapolate data into cubes for further contextual and drill-down analysis.

II. Security Architect

The security architect keeps abreast of occurrences in the IT security landscape and translates threats into concrete policies and safeguards that protect the enterprise while reporting upward. As the front-line of security knowledge, the security architect directs much of the thought that will result in the creation of new SBOs and workflows, as well as the usage of existing libraries. The primary interactions with the system may be as follows:

Work with security engineers to translate policies into relevant SBOs and workflows defined in terms of the data ontology.

Review aggregated output of SBO activities for coherency, policy relevance, and accuracy Ensure that SBOs and workflows are being created that reflect the current state of the security landscape and the overall security posture requirements of the business.

Use an SBO construction tool to create objects and workflows using the ontology directly.

III. Security Engineer

The security engineer's primary responsibility is converting security policy into functional action. The engineer works directly with both security controls and the system to establish security safeguards that are appropriate to business needs. The security engineer's primary interaction with the system may be as follows:

Author specific SBOs designed to encapsulate individual security queries. Each object is a representation of a specific set of variables providing some security knowledge as distilled through the engineer's expertise.

Work with an SBO construction tool to create objects and workflows derived from the ontology.

Create workflows of SBOs (both from built-in library objects and custom-created objects) that are designed to filter and contextualize information such that the security analyst persona is directed to targeted information about any threat, vulnerability, or exploit.

Continually update SBOs and workflows for changes in the overall enterprise environment, policies, or functioning.

Create custom variables for unsupported integrations

Use-Cases

The following presents certain use cases for the system, illustrating certain features of the system in operation.

1. Security Analyst [Access-01]

Summary: The Security Analyst wishes to perform a query on data as it enters the system in real-time. The analyst will choose SBOs or workflows that are pertinent to the data desired, run the queries from the SBO layer, and analyze the results in a downstream cube or other presentation method.

Preconditions:

1. The analyst has a goal in mind for data being sought, either in reaction to a security event or as a more general inquiry that relates to real-time event data.

2. SBOs (and, if necessary, workflows) exist that support the type of query being initiated.

Main Flow of Events:

1. The user chooses an SBO [or workflow] relevant to a given vulnerability, exploit, or exposure from the SBO library.

2. Data about the event being sought, e.g. specific source addresses, network realms, users, or assets, must be entered as filter components to the SBO.

3. [Optional] Additional SBOs may be brought into or removed from the workflow in order to provide more appropriate end results. These SBOs would be connected with logical operators.

4. Once the workflow and filters are complete, the user executes the workflow, which causes execution of all underlying SBO queries.

5. Data is queried and returned from the data store, and presented via a data interaction interface as a cube or other relevant object. All variables taken into account for the query are represented in this object.

Postconditions:

1. A user may schedule the executed real-time query to run at certain times.

2. Output actions may be associated with the real-time query for future usage

3. A workflow constructed in the course of querying may be saved.

Exceptional Flow of Events:

If no data is returned, the user re-works and resubmits a query, on the assumption that the filtering or usage of the original workflow or SBO was too narrow.

2. Security Analyst [Access-02]

Summary: The Security Analyst wishes to perform a query on historical data residing in the datastore for forensic, compliance, or research purposes. The analyst will choose SBOs or workflows that are pertinent to the data desired, run the queries from the SBO layer, and analyze the results in a downstream cube or other presentation method.

Preconditions:

1. The analyst has have a goal in mind for data being sought, either in reaction potential security events occurring in the past or as a more general compliance or research exercise.

2. SBOs (and, if necessary, workflows) exist that support the type of query being initiated.

Main Flow of Events:

1. The user chooses a SBO [or workflow] relevant to a given vulnerability, exploit, or exposure from the SBO library.

2. Data about the event being sought, e.g. specific source addresses, network realms, users, or assets, must be entered as filter components to the SBO.

3. [Optional] Additional SBOs may be brought into or removed from the workflow in order to provide more appropriate end results. These SBOs would be connected with logical operators.

4. Once the workflow and filters are complete, the user executes the workflow, which causes execution of all underlying SBO queries.

5. Data is queried and returned from the data store, and presented via the standard data interaction interface as a cube or other relevant object. All variables taken into account for the query are represented in this object.

Postconditions:

1. A user may schedule the executed historical query to run at certain times.

2. The query may be converted to a real-time query, and output actions may be associated with the real-time query for future usage 3. A workflow constructed in the course of querying may be saved.

Exceptional Flow of Events:

If no data is returned, the user re-works and resubmits a query, on the assumption that the filtering or usage of the original workflow or SBO was too narrow.

3. Security Engineer/Architect [Query-01]

Summary: The Security Engineer is to author a new SBO [and optional workflow] based upon a business need or policy dictated by the security architect. The engineer identifies the types of data that model the behavior being sought, creates query objects, optionally chains these objects together into a workflow and instantiates them as SBOs in the library. The SBOs are then available for usage by security analysts and other relevant users.

Preconditions:

1. The Security Engineer has a set of goal data that can be attained by correlating among the information available from all data sources.

2. Data has been normalized such that data objects that cross source boundaries (e.g. event data and vulnerability data) use the same data model, taxonomy, and semantics.

3. Sample data for the behavior being modeled is available for testing once the SBOs [and workflow] are complete.

Main Flow of Events:

1. For each SBO to be modeled, the security engineer executes raw SQL and/or MDX queries to the database in an SBO construction tool, and analyzes the results.

2. Once a discrete query has been built that retrieves that data necessary for a given SBO, that query is codified and named as a new SBO.

3. [Optional] Multiple queries may be built into a single SBO using logical operators, such that the object provides the appropriate set of data for the individual goal.

4. The variables that are used in the new SBO are identified, and made available as output hooks of this particular object.

5. [Optional] Static attributes may also be assigned as output data for the given object.

6. Input filters are defined for a given object, such that if it is to be used downstream as part of a workflow, the types of data admissible (made in terms of lexical objects) are defined.

7. [Optional] The above process may be repeated for additional SBOs, and any SBOs with compatible input/output attributes may be chained together using logical operators such that the individual objects provide contextualization and data aggregation in a workflow.

Postconditions:

1. A user may schedule the new SBO or workflow to run at certain times.

2. The new SBO or workflow may be converted to a real-time query, and output actions may be associated with the real-time query for future usage 3. A workflow constructed in the course of querying may be saved.

Exceptional Flow of Events:

If no data is returned, the user re-writes the query until the appropriate data is obtained.

Visualization

The SBO layer 50 may provide a concrete visual interface into both an SBO library as well as workflows. These are preferably represented in a manner that allows a Security Analyst user to easily identify those components that are useful for the Analyst's purposes, and quickly chain individual objects together to form a workflow. Input and Output restrictions may also be clearly and easily identified via visual representations.

While various embodiments of the invention have been particularly shown and described, it will be understood by those skilled in the art that various changes in form and details may be made therein without departing from the spirit and scope of the invention as defined by the appended claims.

What is claimed is:

1. A security information and event management system, comprising:

a data storage sub-system operative to store (1) security data from one or more sources, the security data pertaining to security-related events and states of a production computer system, (2) a collection of security business objects serving as an abstraction layer over the security data, each security business object representing a respective security-related aspect of the production system and including a respective set of queries of the sources of security data to generate respective output security data pertaining to the respective security-related aspect, the security business objects including (i) threat/attack objects including respective queries and logical operations on event data describing events in the production computer system, (ii) vulnerability objects including respective queries and logical operations on vulnerability data describing vulnerabilities of the production computer system, and (iii) asset objects including respective queries and logical operations on asset data describing configuration of assets in the production computer system, and (3) a collection of security workflows each including a respective set of the security business objects organized in a respective workflow-specific manner, each security workflow embodying a respective complex and multi-step security analysis operation with respect to the production computer system, at least one of the security workflows including a threat/attack object, a vulnerability object and an asset object arranged in user-specified sequence with output security data of one object serving as input security data to a next succeeding object; and processing circuitry operative in response to user input to execute the security workflows including the respective security business objects, the execution of each security workflow resulting in a corresponding set of result data stored in the data storage sub-system, the result data identifying one or more security threats and system-specific vulnerability information regarding vulnerability of the production computer system to the security threats.

2. A security information and event management system according to claim 1, employing a unified data ontology by which the security business objects reference the security data, the unified data ontology providing a single set of content, meaning and structure for the security data across all the sources.

3. A security information and event management system according to claim 1, wherein the security business objects include respective processing routines providing respective functions selected from data filtering, data seeking, and data transformation.

4. A security information and event management system according to claim 1, wherein each security workflow includes one or more context security business objects providing system-specific contextualization of a respective threat, the contextualization including vulnerability context data from which the vulnerability information in the result data is derived.

5. A security information and event management system according to claim 1, wherein the security business objects of each workflow are functionally arranged such that output data from one or more of the security business objects serves as input data to a respective other one or ones of the security business objects, and each security business object performs a respective logical operation on its input data to generate its output data.

6. A security information and event management system according to claim 1, wherein the security data is collected from the production computer system and includes data describing detected activities in the production computer system that may have security implications.

7. A security information and event management system according to claim 3, wherein the security business objects are each arranged to obtain and process the security data pertaining to a respective distinct one of the security threats or a respective distinct one of a set of vulnerabilities of the production computer system to the security threats.

8. A security information and event management system according to claim 3, wherein the security business objects include trigger-type security business objects and context-type security business objects, the processing routine of each trigger-type security business object employing gathered security data to direct continuing operation to a next step in a workflow, the processing routine of each context-type security business object operating to enrich security data gathered in one or more trigger-type security business objects in a workflow.

9. A security information and event management system according to claim 3, wherein the security business objects are user-definable by user of the system.

10. A security information and event management system according to claim 4, wherein the contextualization includes software asset data regarding a software configuration of a computer of the production computer system, the asset data identifying a patch level of the software configuration and used by a security business object of the workflow to generate a recommendation regarding installation of a software patch to address the respective security threat.

11. A security information and event management system according to claim 5, wherein the workflows are user-definable by users of the system by selection and arrangement of existing security business objects.

12. A security information and event management system according to claim 6, wherein the security data includes data collected from network event sources in the production computer system including application firewalls and intrusion detection sensors.

13. A method of operating a security information and event management system, comprising:

storing, in a data storage sub-system, (1) security data from one or more sources, the security data pertaining to security-related events and states of a production computer system, (2) a collection of security business objects serving as an abstraction layer over the security data, each security business object representing a respective security-related aspect of the production system and including a respective set of queries of the sources of security data to generate respective output security data pertaining to the respective security-related aspect, the security business objects including (i) threat/attack objects including respective queries and logical operations on event data describing events in the production computer system, (ii) vulnerability objects including respective queries and logical operations on vulnerability data describing vulnerabilities of the production computer system, and (iii) asset objects including respective queries and logical operations on asset data describing configuration of assets in the production computer system, and (3) a collection of security workflows each including a respective set of the security business objects organized in a respective workflow-specific manner, each security workflow embodying a respective complex and multi-step security analysis operation with respect to the production computer system, at least one of the security workflows including a threat/attack object, a vulnerability object and an asset object arranged in a user-specified sequence with output security data of one object serving as input security data to a next succeeding object; and by processing circuitry in response to user input, executing the security workflows including the respective security business objects, the execution of each security workflow resulting in a corresponding set of result data stored in the data storage sub-system, the result data identifying one or more security threats and system-specific vulnerability information regarding vulnerability of the production computer system to the security threats.

14. A method according to claim 13, employing a unified data ontology by which the security business objects reference the security data, the unified data ontology providing a single set of content, meaning and structure for the security data across all the sources.

15. A method according to claim 13, wherein the security business objects include respective processing routines providing respective functions selected from data filtering, data seeking, and data transformation.

16. A method according to claim 13, wherein each security workflow includes one or more context security business objects providing system-specific contextualization of a respective threat, the contextualization including vulnerability context data from which the vulnerability information in the result data is derived.

17. A method according to claim 13, wherein the security business objects of each workflow are functionally arranged such that output data from one or more of the security business objects serves as input data to a respective other one or ones of the security business objects, and each security business object performs a respective logical operation on its input data to generate its output data.

18. A method according to claim 15, wherein the security business objects are each arranged to obtain and process the security data pertaining to a respective distinct one of the security threats or a respective distinct one of a set of vulnerabilities of the production computer system to the security threats.

19. A method according to claim 15, wherein the security business objects include trigger-type security business objects and context-type security business objects, the processing routine of each trigger-type security business object employing gathered security data to direct continuing operation to a next step in a workflow, the processing routine of each context-type security business object operating to enrich security data gathered in one or more trigger-type security business objects in a workflow.

20. A method according to claim 15, wherein the security business objects are user-definable by user of the system.

21. A method according to claim 16, wherein the contextualization includes software asset data regarding a software configuration of a computer of the production computer system, the asset data identifying a patch level of the software configuration and used by a security business object of the workflow to generate a recommendation regarding installation of a software patch to address the respective security threat.

22. A method according to claim 17, wherein the workflows are user-definable by users of the system by selection and arrangement of existing security business objects.

* * * * *